(12) United States Patent
Kobayashi et al.

(10) Patent No.: US 8,179,806 B2
(45) Date of Patent: May 15, 2012

(54) DEVICE, METHOD, AND PROGRAM FOR ESTIMATING QUALITY-DEGRADED LOCATION OF COMMUNICATION NETWORK, AND COMMUNICATION NETWORK SYSTEM

(75) Inventors: Masayoshi Kobayashi, Tokyo (JP); Tsutomu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 12/187,659

(22) Filed: Aug. 7, 2008

(65) Prior Publication Data
US 2009/0052331 A1    Feb. 26, 2009

(30) Foreign Application Priority Data

Aug. 23, 2007  (JP) ................................ 2007-217404

(51) Int. Cl.
*G01R 31/08*  (2006.01)
(52) U.S. Cl. ...................................................... 370/242
(58) Field of Classification Search .................. 370/229, 370/230, 232, 235, 237, 238, 241, 252, 254, 370/351, 242
See application file for complete search history.

(56) References Cited

U.S. PATENT DOCUMENTS

| | | | | |
|---|---|---|---|---|
| 6,557,112 | B1 * | 4/2003 | Shimada ........................... | 714/4 |
| 7,583,613 | B2 * | 9/2009 | Klotz et al. .................... | 370/252 |
| 2004/0165526 | A1 * | 8/2004 | Yada et al. ..................... | 370/228 |
| 2007/0230346 | A1 * | 10/2007 | Yamada et al. ............... | 370/235 |

FOREIGN PATENT DOCUMENTS

| | | |
|---|---|---|
| JP | 2002-271392 | 9/2002 |
| JP | 2006-033715 | 2/2006 |
| JP | 2006-238052 | 9/2006 |

* cited by examiner

*Primary Examiner* — Kwang B Yao
*Assistant Examiner* — Anh Ngoc Nguyen
(74) *Attorney, Agent, or Firm* — Scully, Scott, Murphy & Presser, PC (57) ABSTRACT

Estimation is carried out with high accuracy based on flow quality information in a situation where, although a set of links that may have a flow passing through is known, which of such links the flow passed through cannot be identified, such as multi-paths routing, load distribution routing, and the like. A device for estimating a quality-degraded location includes a flow quality information collecting section that collects communication quality of a flow of a network, a routing information collecting section that collects routing information of the network, a determining section for determining a quality-degraded flow and a quality-non-degraded flow based on the flow quality information to determine a link through which the flow passes from the routing information of the network, a non-degraded link elimination section that eliminates a link not configuring multi-paths as a non-degraded link without eliminating a link configuring multi-paths as a non-degraded link, for a link on a path of the flow, with respect to the quality-non-degraded flow, and a degraded link determining section for determining a degraded link from links not eliminated as the non-degraded links.

10 Claims, 10 Drawing Sheets

| | L10 | L20 | L30 | L40 | L50 | L60 | L70 | L80 | L90 | L100 | L110 | L120 | L130 | L140 | L150 | L160 | L170 | L180 | L190 | L200 | L210 | QUALITY FLAG |
|---|---|---|---|---|---|---|---|---|---|---|---|---|---|---|---|---|---|---|---|---|---|---|
| F1 | 1 | 0 | 0 | 0 | 0 | 0 | 0 | 0 | 2 | 2 | 2 | 2 | 0 | 0 | 0 | 0 | 0 | 0 | 0 | 0 | 0 | Good |
| F2 | 0 | 1 | 0 | 0 | 0 | 0 | 0 | 0 | 2 | 2 | 2 | 2 | 0 | 1 | 0 | 0 | 0 | 0 | 0 | 0 | 0 | Good |
| F3 | 0 | 0 | 1 | 0 | 0 | 0 | 0 | 0 | 2 | 2 | 2 | 2 | 0 | 0 | 1 | 0 | 0 | 0 | 0 | 0 | 0 | Good |
| F4 | 0 | 0 | 0 | 1 | 0 | 0 | 0 | 0 | 2 | 2 | 2 | 2 | 0 | 0 | 0 | 1 | 0 | 0 | 0 | 0 | 0 | Good |
| F5 | 0 | 0 | 0 | 0 | 1 | 0 | 0 | 0 | 2 | 2 | 2 | 2 | 0 | 0 | 0 | 0 | 1 | 0 | 0 | 0 | 0 | Good |
| F6 | 0 | 0 | 0 | 0 | 0 | 1 | 0 | 0 | 2 | 2 | 2 | 2 | 1 | 1 | 0 | 0 | 0 | 1 | 0 | 0 | 0 | Bad |
| F7 | 0 | 0 | 0 | 0 | 0 | 0 | 1 | 0 | 2 | 2 | 2 | 2 | 1 | 0 | 1 | 0 | 0 | 0 | 1 | 0 | 0 | Bad |
| F8 | 0 | 0 | 0 | 0 | 0 | 0 | 0 | 1 | 2 | 2 | 2 | 2 | 1 | 0 | 0 | 1 | 0 | 0 | 0 | 0 | 1 | Bad |

FIG.9

| | P=1 L60 | P=1 L70 | P=1 L80 | P=2 L90 | P=2 L100 | P=2 L110 | P=2 L120 | P=1 L130 | P=1 L190 | P=1 L200 | P=1 L210 | QUALITY FLAG |
|---|---|---|---|---|---|---|---|---|---|---|---|---|
| F1 | 0 | 0 | 0 | 2 | 2 | 2 | 2 | 0 | 0 | 0 | 0 | Good |
| F2 | 0 | 0 | 0 | 2 | 2 | 2 | 2 | 0 | 0 | 0 | 0 | Good |
| F3 | 0 | 0 | 0 | 2 | 2 | 2 | 2 | 0 | 0 | 0 | 0 | Good |
| F4 | 0 | 0 | 0 | 2 | 2 | 2 | 2 | 0 | 0 | 0 | 0 | Good |
| F5 | 0 | 0 | 0 | 2 | 2 | 2 | 2 | 0 | 0 | 0 | 0 | Good |
| F6 | 1 | 0 | 0 | 2 | 2 | 2 | 2 | 1 | 1 | 0 | 0 | Bad |
| F7 | 0 | 1 | 0 | 2 | 2 | 2 | 2 | 1 | 0 | 1 | 0 | Bad |
| F8 | 0 | 0 | 1 | 2 | 2 | 2 | 2 | 1 | 0 | 0 | 1 | Bad |

FIG.10

| | L60 | L70 | L80 | L130 | L190 | L200 | L210 | QUALITY FLAG |
|---|---|---|---|---|---|---|---|---|
| F6 | 1 | 0 | 0 | 1 | 1 | 0 | 0 | Bad |
| F7 | 0 | 1 | 0 | 1 | 0 | 1 | 0 | Bad |
| F8 | 0 | 0 | 1 | 1 | 0 | 0 | 1 | Bad |

FIG. 12

|    | L50 | L60 | L70 | L80 | L90 | L100 | L110 | L120 | L130 | L180 | L190 | L200 | L210 | QUALITY FLAG |
|----|-----|-----|-----|-----|-----|------|------|------|------|------|------|------|------|--------------|
| F5 | 1   | 1   | 0   | 0   | 2   | 2    | 2    | 2    | 1    | 1    | 0    | 0    | 0    | Bad          |
| F6 | 0   | 1   | 0   | 0   | 2   | 2    | 2    | 2    | 1    | 0    | 1    | 0    | 0    | Bad          |
| F7 | 0   | 0   | 1   | 0   | 2   | 2    | 2    | 2    | 1    | 0    | 0    | 1    | 0    | Bad          |
| F8 | 0   | 0   | 1   | 1   | 2   | 2    | 2    | 2    | 1    | 0    | 0    | 0    | 1    | Bad          |

FIG. 13

|    | L50 | L60 | L90 | L100 | L110 | L120 | L130 | L180 | L190 | QUALITY FLAG |
|----|-----|-----|-----|------|------|------|------|------|------|--------------|
| F5 | 1   | 1   | 2   | 2    | 2    | 2    | 1    | 1    | 0    | Bad          |
| F6 | 0   | 1   | 2   | 2    | 2    | 2    | 1    | 0    | 1    | Bad          |

| | L10 | L20 | L30 | L45 | L50 | L40 | QUALITY (PACKET LOSS RATE) |
|---|---|---|---|---|---|---|---|
| F1 | 1 | 1 | 1 | | | | 3.0% |
| F2 | | 1 | 1 | | 1 | | 2.5% |
| F3 | | 1 | | | | 1 | 3.5% |
| F4 | | 1 | | | | | 1.0% |
| F5 | | | 1 | 1 | | | 0.5% |

FIG.17

| | L10 | L20 | L30 | L45 | L50 | L40 | QUALITY (PACKET LOSS RATE) |
|---|---|---|---|---|---|---|---|
| F1 | 1 | 1 | 1 | | | | 3.0% |
| F2 | | 1 | 1 | | 1 | | 2.5% |
| F3 | | 1 | | | | 1 | 3.5% |
| F4 | | 1 | | | | | 1.0% |
| F5 | | | 1 | 1 | | | 0.5% |

FIG.18

| | L10 | L20 | L50 | L40 |
|---|---|---|---|---|
| F1 | 1 | 1 | | |
| F2 | | 1 | 1 | |
| F3 | | 1 | | 1 |

DEVICE, METHOD, AND PROGRAM FOR ESTIMATING QUALITY-DEGRADED LOCATION OF COMMUNICATION NETWORK, AND COMMUNICATION NETWORK SYSTEM

INCORPORATION BY REFERENCE

This application is based upon and claims the benefit of priority from Japanese patent application No. 2007-217404 filed on Aug. 23, 2007, the disclosure of which is incorporated herein in its entirety by reference.

BACKGROUND OF THE INVENTION

1. Technical Field

The present invention relates to a device, a method, and a program for estimating a quality-degraded location of a communication network, and a communication network system, in particular, to a system for estimating a degraded location in communication quality of a network from flow quality information corresponding to multi-paths routing.

2. Background Art

In a communication network, in order to identify a communication quality-degraded location at high speed at the time communication quality is degraded, a number of monitoring devices are allocated in the network so as to continuously monitor the communication quality at locations the monitoring devices are allocated. Then, at the time the communication quality is degraded, a section with degraded quality is estimated based on a position of the monitoring device at which the quality degradation occurs. In this system, there is a problem that a number of monitoring devices are necessary in order to increase estimation accuracy of a position where quality is degraded, and cost for allocating such monitoring devices is high. In order to handle this problem, as a related art, there is a system for estimating a quality-degraded location from routing information and quality information of a communication flow passing through a network (refer to, JP-A-2006-238052). Hereinafter, description will be made with respect to this system.

Figure 14:
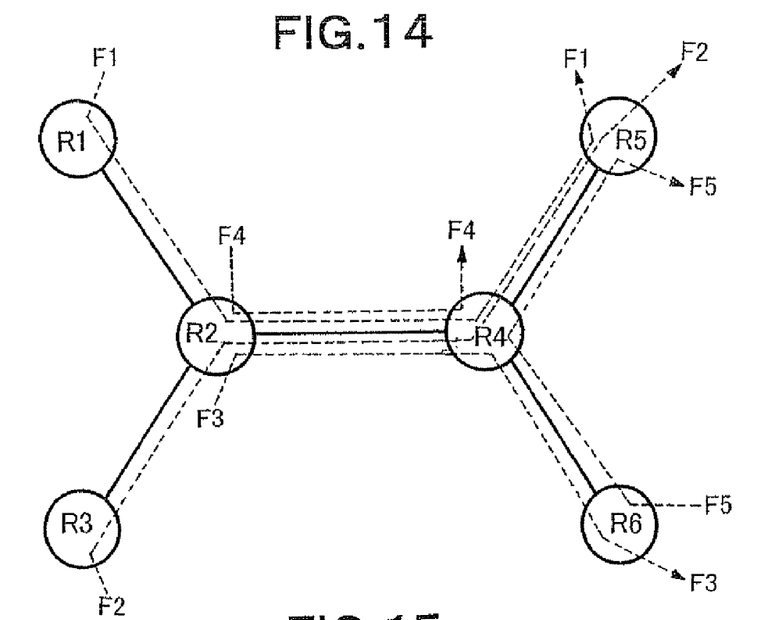
FIG. 14 is a view for explaining a relationship between a network and a flow of a related art.
Figure 15:
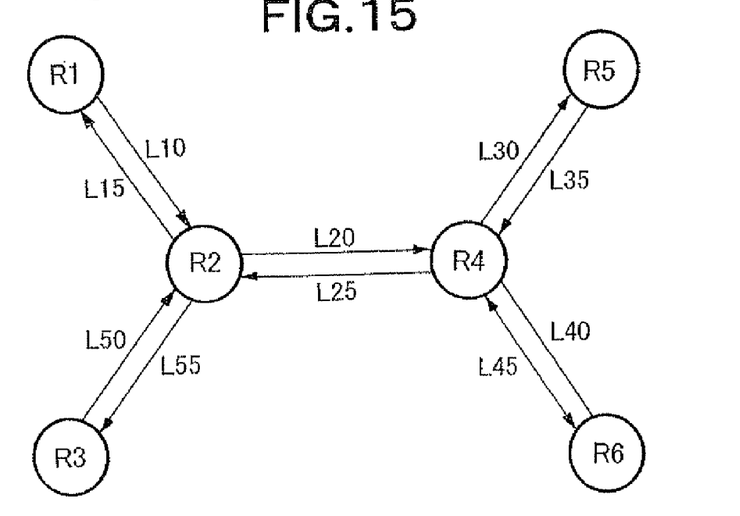
FIG. 15 is a view for explaining a link that connects routers of a network in the related art.
Figure 16:
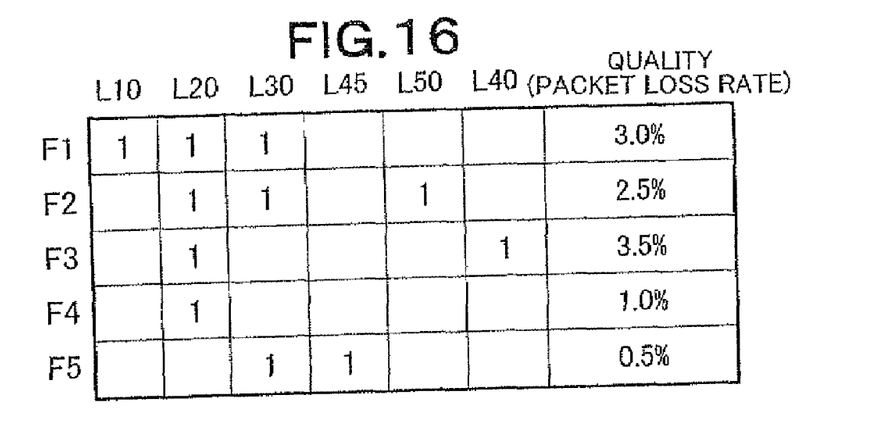
FIG. 16 is a view for explaining an example of a flow/link correspondence table of the related art.

First, a correspondence table (flow-link correspondence table) of flows, links (directed links) through which the flows pass, and quality is created. For example, flows F1 to F5 are assumed to pass through a network including routers (or packet switches) R1 to R6 as shown in FIG. 14. With respect to the network of FIG. 14, names are assigned to the links as shown in FIG. 15, and packet loss rates are used to show quality. Then, assuming that packet loss rates of the flows F1 to F5 are 3.0%, 2.5%, 3.5%, 1.0%, and 0.5%, respectively, the flow-link correspondence table is created as shown in FIG. 16. In this state, each flow is assumed to carry 100 packets per second, and a packet loss rate is determined based on an amount of packet loss for every 2 seconds.

Figure 17:
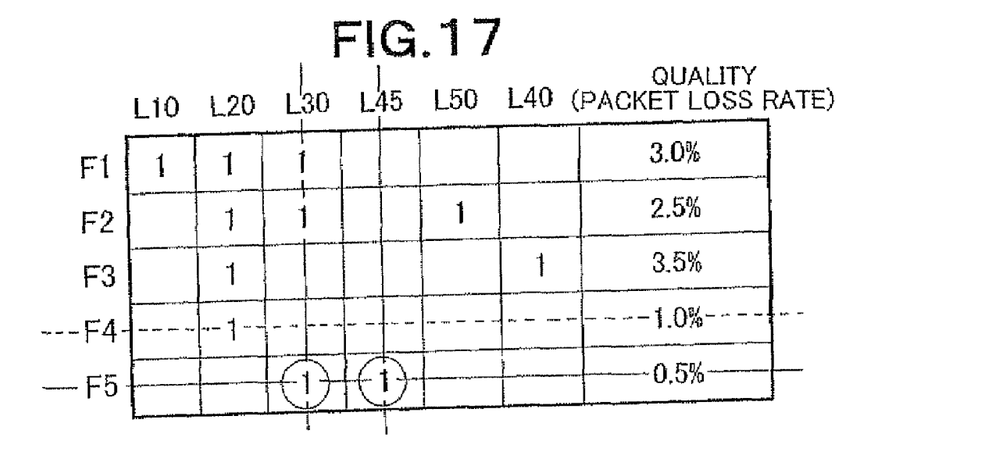
FIG. 17 is a view for explaining an example of non-degraded link elimination processing of the related art.

Next, non-degraded link elimination processing is carried out. That is, on the basis of a degradation threshold value and non-degradation threshold value of flow quality set in advance, a flow with quality lower than the degradation threshold value is set to be a degraded flow, a flow with quality higher than the non-degradation threshold value is set to be a non-degraded flow, and a flow other than the above is set to be a middle quality flow. Then, a reduced flow-link correspondence table is created by eliminating a row of the middle quality flow, a row of the non-degraded flow, and a column of a link through which the non-degraded flow passes from the flow-link correspondence table. In the above example, for example, assuming that a packet loss rate of 2% is set to be a degradation threshold value and a packet loss rate of 1% is set to be a non-degradation threshold value, the flows F1 to F3 are degraded flows, the flow F5 is a non-degraded flow, and the flow F4 is a middle flow. Then, a reduced flow-link correspondence table is created in a manner that a row of the middle flow, a row of the non-degraded flow, and columns having a value of 1 in the row of the non-degraded flow are eliminated from the flow-link correspondence table. A state of the removal in the above example is shown in FIG. 17, and the reduced flow-link correspondence table is shown in FIG. 18.

Figure 18:
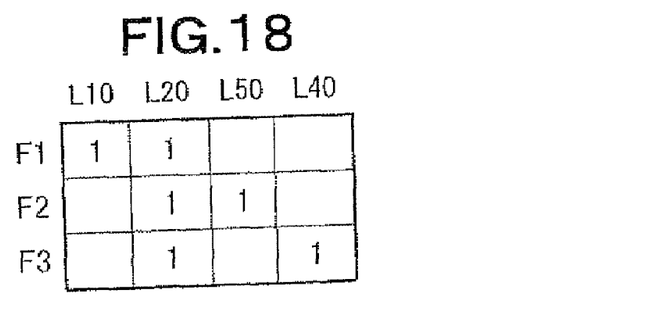
FIG. 18 is a view for explaining an example of a reduced flow/link correspondence table of the related art.

Finally, a degraded location is estimated based on FIG. 18. For example, in an estimation method based on the number of quality-degraded flows, the numbers of flows with degraded quality that pass through links L10, L20, L50, and L40 are 1, 3, 1, and 1, respectively. Among the above links, the link L20 through which the largest number of flows pass is estimated as a degraded location.

Alternatively, a degraded location is estimated by a minimum link number estimation method described below.

In the minimum link number estimation method, a set of flows that pass through each of the links in FIG. 18 is considered. Then, a set of links that includes all the flows in FIG. 18 with a minimum number of links is determined, and such a set of links is set to be a set of degraded links. That is, in the example of FIG. 18, sets of flows that pass through links L10, L20, L50, and L40 are {F1}, {F1, F2, F3}, {F2}, and {F3}, respectively. For example, a sum-set of flows that pass through a set of links {L10, L50, L40} including three links is {F1, F2, F3}, and all the flows can be included. Other than the above, all the flows can be included by a set of links {L10, L20} including two links and by a set of link {L20} including one link. Among such sets of links that include all the flows, the set {L20} having the minimum number of links is estimated as a set of minimum links.

In the estimation system of a quality-degraded location by the related art described above, a link through which a flow passes is assumed to be able to be uniquely identified. However, in a network applied with multi-paths routing, load distribution routing, and the like, there are two or more paths that a flow may pass through. Therefore, there is a case where through which pass a flow actually passed cannot be identified. In such a case, the estimation system of a quality-degraded location by the related art cannot be applied.

SUMMARY

An exemplary object of the present invention is to carry out estimation with high accuracy based on flow quality information in a situation where, although a set of links that may have a flow passing through are known, which of such links the flow passed through cannot be identified, such as multi-paths routing, load distribution routing, and the like.

A device for estimating a quality-degraded location of a communication network according to exemplary aspect of the invention includes: a flow quality information collecting means for collecting communication quality information of a flow passing the communication network; a routing information collecting means for collecting routing information of the communication network; a determining means for determining a quality-degraded flow and a quality-non-degraded flow based on the flow quality information and determining links through which the flow passes from the routing information of the communication network; a non-degraded link elimination means for eliminating a link not configuring multi-paths on the links on a pass of the flow as a non-degraded link, without eliminating a link configuring multipaths on the links on a pass of the flow as a non-degraded link, with respect to the quality-non-degraded flow; and a degraded link determining means for determining a degraded link from links not eliminated as the non-degraded link.

EXEMPLARY EMBODIMENTS

Hereinafter, description will be made with respect to exemplary embodiments according to a device, a method, and a program for estimating a quality-degraded location of a communication network and a communication network system according to the present invention with reference to the accompanying drawings.

First Exemplary Embodiment

First, a first exemplary embodiment of the present invention will be described with reference to FIGS. 1 to 6.

Figure 1:
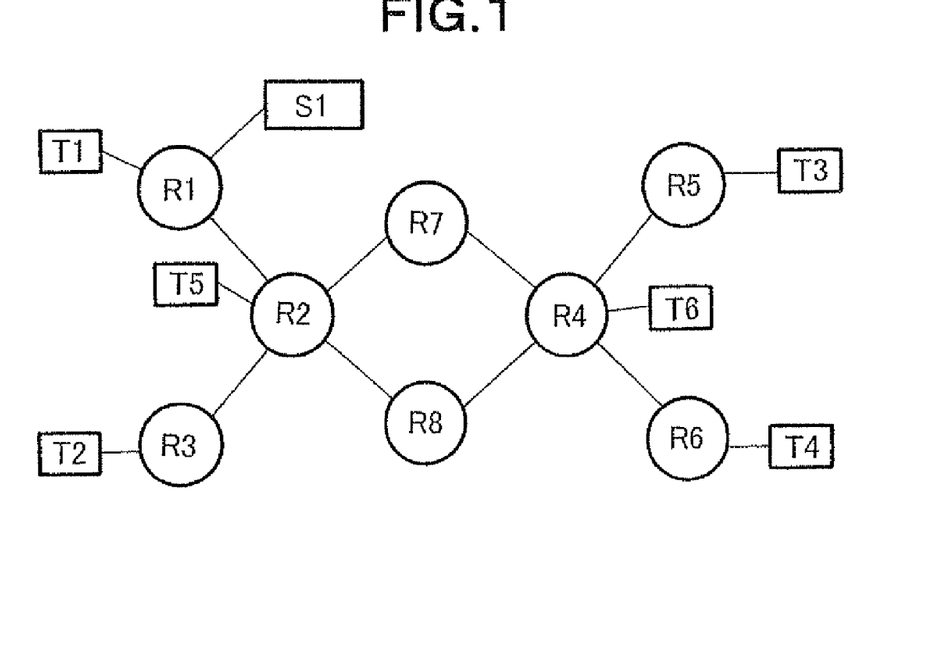
FIG. 1 is a network configuration view showing an entire configuration of a communication network system according to a first exemplary embodiment of the present invention.

FIG. 1 shows an entire configuration of a communication network (corresponding to a communication network system of the present invention) according to the present embodiment. A communication network shown in FIG. 1 includes a plurality of routers or switches (eight routers in the illustrated example) R1 to R8, a plurality (six in the illustrated example) of terminals T1 to T6, and a server S1 (corresponding to a device for estimating a quality-degraded location of the present invention) for estimating a quality-degraded location, which are connected with each other in a communicable manner.

In the example of FIG. 1, four routers R1, R3, R5, and R6 are allocated at end sections of the communication network, and four routers R2, R4, R7, and R8 are allocated at a center section of the communication network. Each of the routers R1 and R3 constitutes a link with the adjacent router R2 so that such routers are connected with each other. In addition, each of the routers R5 and R6 constitutes a link with the adjacent router R4 so that such routers are connected with each other. Further, links are constituted for the routers R7 and R8 between the routers R2 and R4 in the center section so that each of the routers R7 and R8 is connected with the routers R2 and R4 in different paths (multi-paths).

Terminals T1, T2, T3, and T4 are connected to the four routers R1, R3, R5, and R6 positioned at end sections, respectively. In addition, the terminals T5 and T6 are connected to the two routers R2 and R4 positioned in the center section, respectively. Further, the server S1 for estimating a quality-degraded location is connected to the router R1 positioned at an end section.

Figure 2:
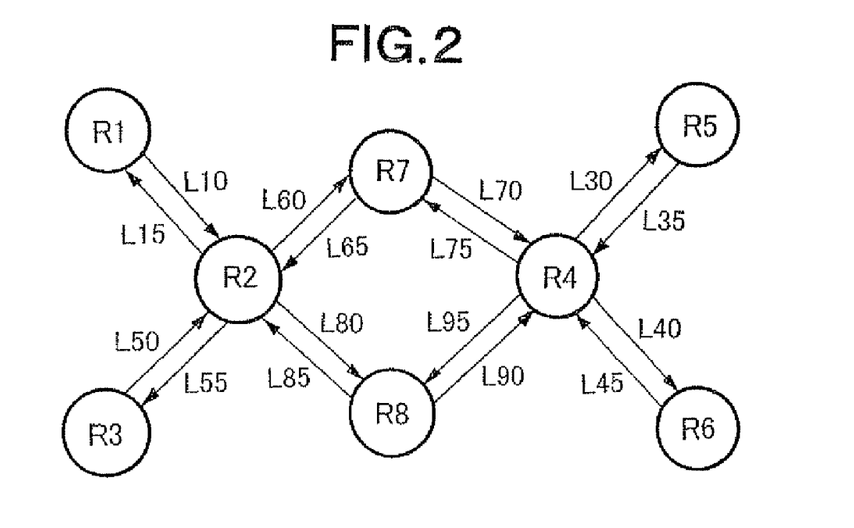
FIG. 2 is a view for explaining links that connect routers of the communication network system shown in FIG. 1.

FIG. 2 explains links that connect the routers of the communication network shown in FIG. 1. Hereinafter, although the links that connect the terminals and the routers are omitted from description, the links that connect the routers work in a similar manner even when the links that connect the terminals and the routers are included.

In FIG. 2, reference symbol L10 indicates a link of a pass directed from the router R1 to the router R2, and reference symbol L15 indicates a link of a pass which is in a direction opposite to L10. Reference symbol L30 indicates a link of a pass directed from the router R4 to the router R5, and reference symbol L35 indicates a link of a pass which is in a direction opposite to L30. Reference symbol L40 indicates a link of a pass directed from the router R4 to the router R6, and reference symbol L45 indicates a link of a pass which is in a direction opposite to L40. Reference symbol L50 indicates a link of a pass directed from the router R3 to the router R2, and reference symbol L55 indicates a link of a pass which is in a direction opposite to L50. Reference symbol L60 indicates a link of a pass directed from the router R2 to the router R7, and reference symbol L65 indicates a link of a pass which is in a direction opposite to L60. Reference symbol L70 indicates a link of a pass directed from the router R7 to the router R4, and reference symbol L75 indicates a link of a pass which is in a direction opposite to L70. Reference symbol L80 indicates a link of a pass directed from the router R2 to the router R8, and reference symbol L85 indicates a link of a pass which is in a direction opposite to L80. Reference symbol L90 indicates a link of a pass directed from the router R8 to the router R4, and reference symbol L95 indicates a link of a pass which is in a direction opposite to L90.

As shown in FIG. 2, passes directed from the router R2 to the router R4 are multi-paths constituted by two paths, which are a path through the routers R2, R7, and R4 in this order (the links L60 and L70), and a path through the routers R2, R8, and R4 in this order (the links L80 and L90).

Figure 3:
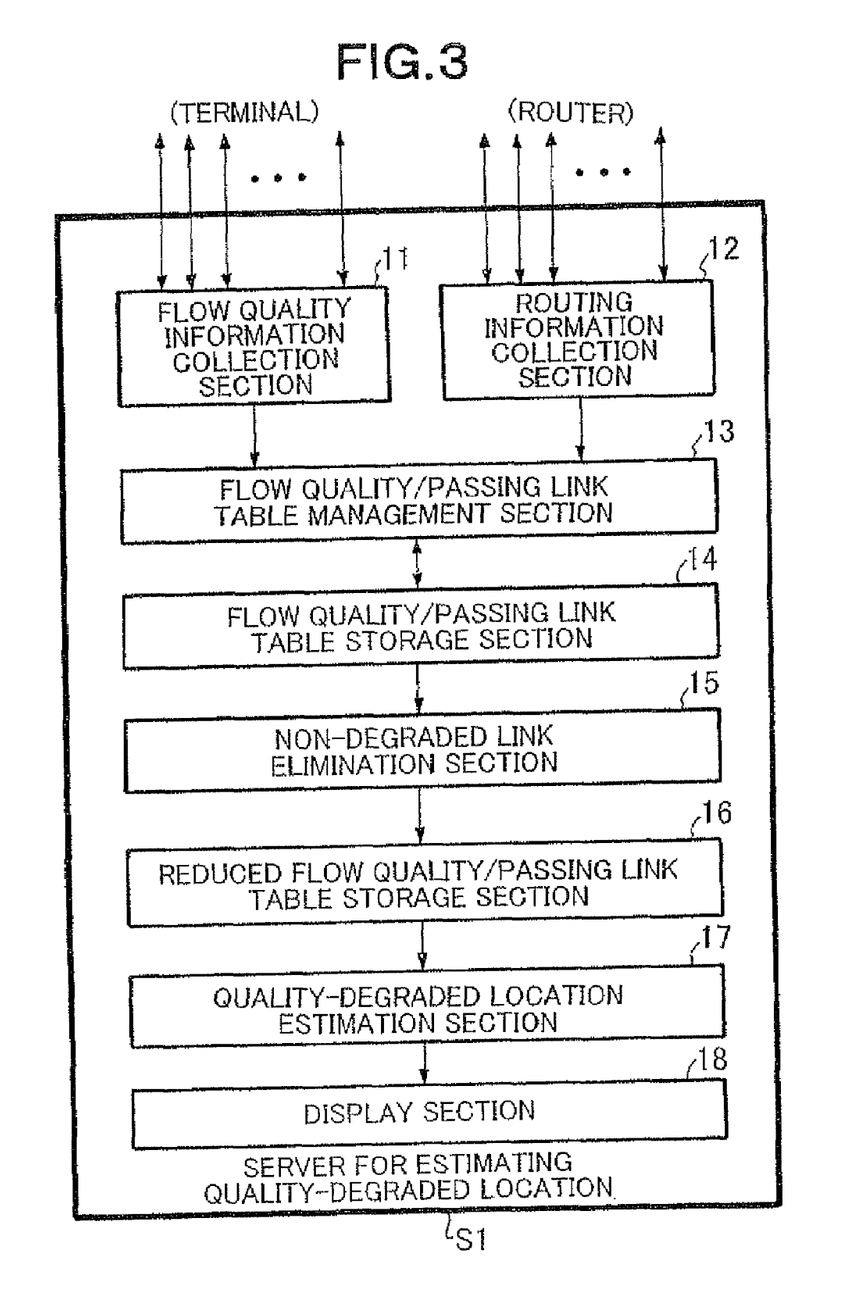
FIG. 3 is a block diagram showing an internal configuration of a server for estimating a quality-degraded location shown in FIG. 1.

FIG. 3 shows an internal configuration view of the server S1 for estimating a quality-degraded location in the present embodiment.

As shown in FIG. 3, the server S1 for estimating a quality-degraded location is configured with a flow quality information collection section 11 (corresponding to a flow quality information collecting means of the present invention), a routing information collection section 12 (corresponding to a routing information collecting means of the present invention), a flow quality/passing link table management section 13 (corresponding to a determining means of the present invention), a flow quality/passing link table storage section 14, a non-degraded link elimination section 15 (corresponding to a non-degraded link elimination means of the present invention), a reduced flow quality/passing link table storage section 16, a quality-degraded location estimation section 17 (corresponding to a degraded link determining means of the present invention), and a display section 18. By this configuration, the server S1 for estimating a quality-degraded location collects quality information for each flow from the terminals T1 to T6, and estimates a quality-degraded location based on routing information obtained from the routers R1 to R8 (or switches). Then, the server S1 for estimating a quality-degraded location outputs an estimation result to the display section 18.

Hereinafter, operation of each constituent of the server S1 for estimating a quality-degraded location will be described.

When a terminal starts communication, the flow quality information collection section 11 is notified thereof from the terminal. In addition, the flow quality information collection section 11 receives current communication quality information and a current flow rate of the terminal from the terminal after start of communication. That is, the flow quality information collection section 11 receives a set of information including an address of a transmission terminal, an address of a receiving terminal, flow quality information, and a packet rate. Then, when the terminal ends the communication, the flow quality information collection section 11 receives a notification of the end of the communication. Here, the flow quality information is information relating to communication quality, such as a packet loss rate, delay, and delay jitter. The packet rate is information of an amount of packets per second of a flow used in the communication.

The routing information collection section 12 collects information relating to routing from the router R1 to R8 (or switches). This can be carried out by using a simple network management protocol (SMTP) and the like. If there is information relating to routing, determination can be made with respect to in which path communication between transmitting and receiving terminals is carried out from address information of such transmitting and receiving terminals. More specifically, the information relating to routing includes a routing table and an address resolution protocol (ARP) table when collected from routers, or a forwarding database and a configuration information of a spanning tree when collected from switches. The information relating to routing can be provided by a network administrator, in stead of being collected from the routers (or switches) R1 to R8.

On the basis of flow quality information obtained from the flow quality information collection section 11 and information relating to routing from the routing information collection section 12, the flow quality/passing link table management section 13 maintains a flow quality/passing link table made up of a set of links through which a flow currently carrying out communication passes and a current flow quality flag of the flow. The flow quality flag is a flag that becomes "Good" or has a flag value corresponding thereto in case quality of each flow is more excellent than a favorable threshold value (non-degradation threshold value) set in advance, and becomes "Bad" or has a flag value corresponding thereto in case quality of such flow is inferior to a degradation threshold value set in advance (and has an indefinite value in other cases).

In FIG. 1, there exist a flow F1 on a path directed from the terminal T1 to the terminal T3, a flow F2 on a path directed from the terminal T2 to the terminal T4, and a flow F3 on a path directed from the terminal T1 to the terminal T4. In case flow quality of the flow F1 is "Good", and flow quality of both the flows F2 and F3 is "Bad", a flow quality/passing link table as shown in FIG. 5 is determined.

Figure 5:
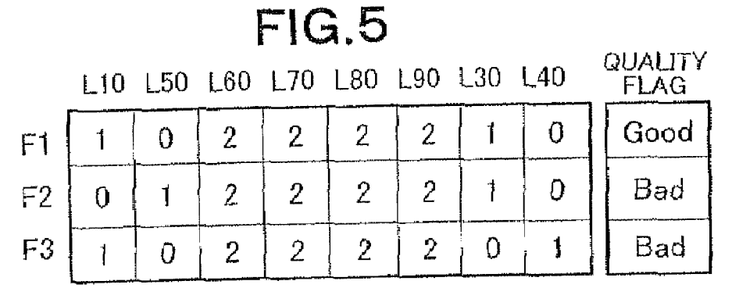
FIG. 5 is a view for explaining an example of a flow quality/passing link table of the server for estimating a quality-degraded location shown in FIG. 3.

In the flow quality/passing link table shown in FIG. 5, rows correspond to the three flows F1, F2, and F3 on paths, and columns correspond to the eight links (passing links) L10, L50, L60, L70, L80, L90, L30, and L40, through which the three flows F1, F2, and F3 pass. In this example, values (table values) entered in squares (cells) divided by rows of flows and columns of links are 1) a value "0" for a link through which a flow does not pass, 2) a value "1" for a link through which a flow passes and which does not constitute multi-paths, and 3) the number of multi-paths for a link through which a flow passes and which constitutes multi-paths. In the example of FIG. 1, for example, the links L60, L70, L80, and L90 are links that constitute two multi-paths, a value of "2" is entered in squares made up of rows of flows passing though these links and columns of the corresponding links.

The flow quality/passing link table storage section 14 stores the flow quality/passing link table maintained by the flow quality/passing link table management section 13 in an updatable manner.

Figure 4:
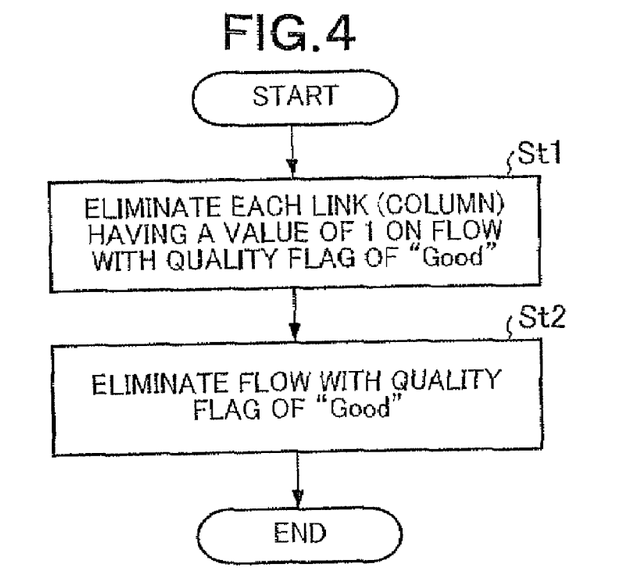
FIG. 4 is a flowchart for explaining non-degraded link elimination processing by a non-degraded link elimination section of the server for estimating a quality-degraded location shown in FIG. 3.

The non-degraded link elimination section 15 carries out non-degraded link elimination processing shown in FIG. 4 with respect to the flow quality/passing link table stored in the flow quality/passing link table storage section 14 to generate a reduced flow quality/passing link table by eliminating quality information and flow rate information. Then, the non-degraded link elimination section 15 writes the reduced flow quality/passing link table in the reduced flow quality/passing link table storage section 16.

Here, as shown in FIG. 4, the non-degraded link elimination processing is configured with Steps St1 and St2 described below.

(a) Step St1

First, each column of a link having a value of "1" on a flow (quality-non-degraded flow or excellent quality flow) with a quality flag of "Good" is eliminated from the flow quality/passing link table as a non-degraded link.

(b) Step St2

Next, a row of a flow with a quality flag of "Good" is eliminated.

By the non-degraded link elimination processing shown in FIG. 4, columns corresponding to the links L10 and L30 having a value of "1" on a path of the flow F1 with a quality flag of "Good" are eliminated from links (step St1). Then, a row corresponding to the flow F1 with a quality flag of "Good" is eliminated (step St2). At a result, as shown in FIG.

Figure 6:
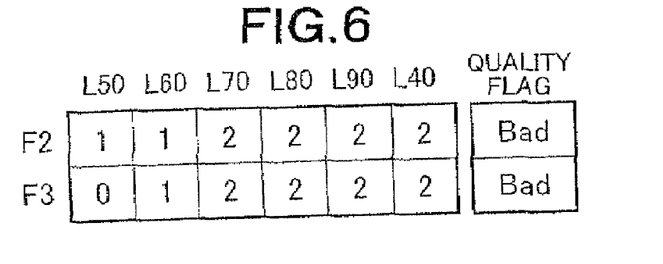
FIG. 6 is a view for explaining a reduced flow quality/passing link table determined by eliminating a non-degraded link from the flow quality/passing link table shown in FIG. 5 by the non-degraded link elimination processing shown in FIG. 4.

6, a reduced flow quality/passing link table configured with columns of the links L50, L60, L70, L80, L90, and L40, which are not eliminated as a non-degraded link is determined with respect to the columns of the flows F2 and F3 (quality-degraded flows) with a quality flag of "Bad".

The reduced flow quality/passing link table storage section 16 stores the reduced flow quality/passing link table determined by the above-described non-degraded link elimination processing in an updatable manner.

The quality-degraded location estimation section 17 reads out the reduced flow quality/passing link table from the reduced flow quality/passing link table storage section 16, and uses an estimation method based on the number of quality-degraded flows or a minimum link number estimation method to determine a degraded link from links not eliminated as non-degraded links. Then, the quality-degraded location estimation section 17 estimates a quality-degraded location and outputs such a location to the display section 18.

The display section 18 displays the quality-degraded location output from the quality-degraded location estimation section 17.

Here, description will be made with respect to processing carried out by the quality-degraded location estimation section 17, that is, processing using an estimation method based on the number of quality-degraded flows and an estimation method based on a minimum link number.

(1) Estimation Method Based on the Number of Quality-Degraded Flows

In the processing using an estimation method based on the number of quality-degraded flows by the quality-degraded location estimation section 17, the number of squares that have a value of "1" or larger ("1" or "2" in the present example) is counted with respect to columns of links of the reduced flow quality/passing link table. Then, the links are arranged in the order of having a larger number of such squares, and the links included up to the order set in advance are estimated as degraded locations. For example, in case of the reduced flow/passing link table as shown in FIG. 6, the numbers of squares having a value of "1" or larger are 1, 2, 2, 2, 2, and 1 with respect to columns of the links L50, L60, L70, L80, L90, and L40, respectively. Then, the links L60, L70, L80, and L90 that are the links having the largest number of squares among these links are estimated as degraded locations.

(2) Estimation Method Based on the Number of Minimum Links

In the processing using an estimation method based on the number of minimum links by the quality-degraded location estimation section 17, a set of flows having a value of "1" or larger as a value of a square with respect to link columns of a flow quality/passing link table is called a flow set belonging to such link columns. For example, in case of the reduced flow quality/passing link table of FIG. 6, a flow set belonging to a column of the link L60 includes {F2, F3}. Further, a sum-set of a flow set belonging to each of a plurality of link columns is similarly called a flow set belonging to a set of such link columns. For example, in case of the reduced flow quality/passing link table of FIG. 6, a flow set belonging to a set of link columns {L50, L60} includes {F2, F3}.

Then, among a set of link columns in which a flow set belonging to the set of link columns is identical to all flows of the reduced flow quality/passing link table, one made up of a minimum number of elements is selected. For example, description will be made with respect to a case in which the quality-degraded location estimation section 17 executes the minimum link number estimation method with respect to the reduced flow quality/passing link table shown in FIG. 6.

In this case, as link sets in which a flow set belonging to a set of link columns includes all flows of the reduced flow quality/passing link table, that is, {F2, F3}, there are {L60}, {L70}, {L80}, {L90}, and {L50, L40}. Among these link sets, link sets having a minimum number of elements are {L60}, {L70}, {L80}, and {L90} having the element number of one. Therefore, in this case as well, as similar to the estimation method based on the number of quality-degraded flows described above, the links L60, L70, L80, and L90 are estimated as degraded links. The minimum link number estimation method can be solved by using an algorism of a minimum cover problem.

In view of the above, according to the present embodiment, a degraded link can be estimated even in case there is a flow passing through multi-paths.

Second Exemplary Embodiment

Next, a second exemplary embodiment of the present invention will be described with reference to FIGS. 7 to 10.

Since the present embodiment is different from the first exemplary embodiment only with respect to operation of the non-degraded link elimination section 15 of the server for estimating a quality degraded location, only such a different point will be described.

Figure 7:
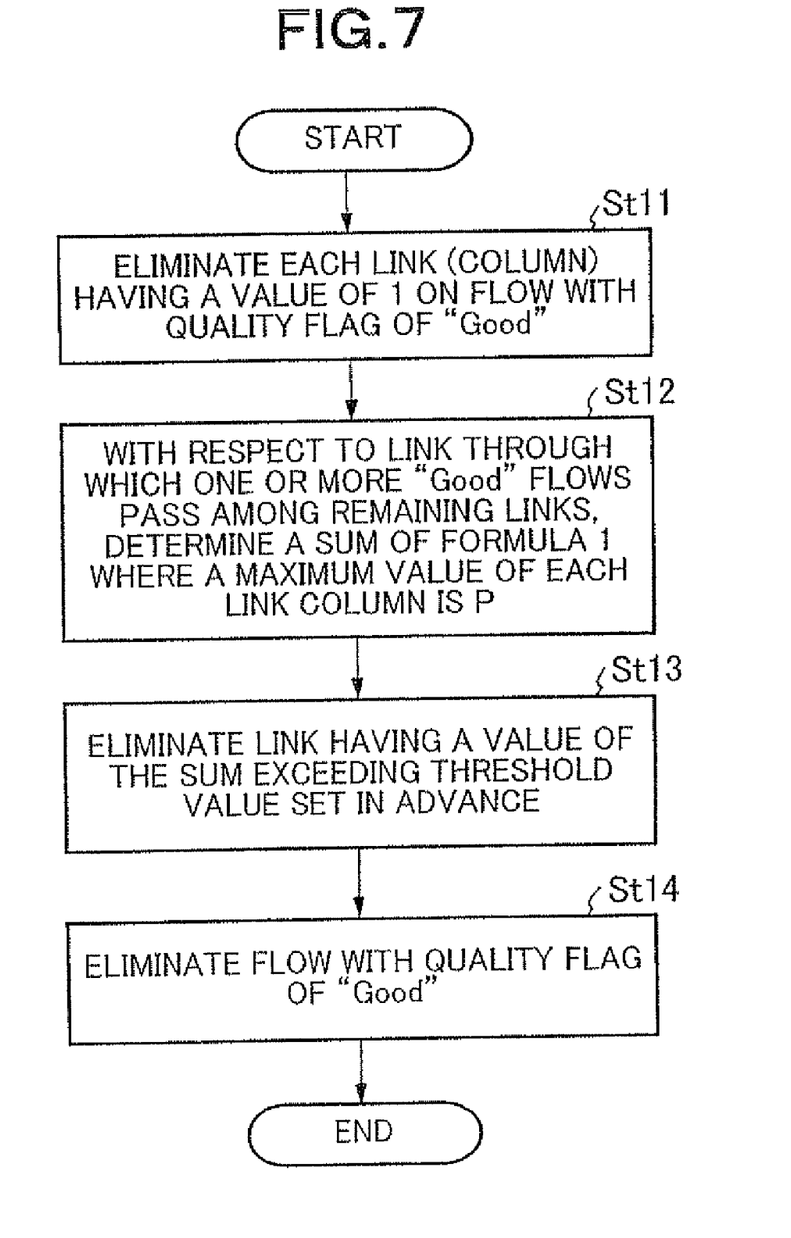
FIG. 7 is a flowchart for explaining non-degraded link elimination processing by the non-degraded link elimination section of the server for estimating a quality-degraded location in the communication network system according to a second exemplary embodiment of the present invention.

The non-degraded link elimination section 15 carries out non-degraded link elimination processing shown in FIG. 7 with respect to a flow quality/passing link table stored in the flow quality/passing link table storage section 14. Then, the non-degraded link elimination section 15 generates a reduced flow quality/passing link table by eliminating quality information and flow rate information, and writes such a reduced flow quality/passing link table in the reduced flow quality/passing link table storage section 16.

As shown in FIG. 7, the non-degraded link elimination processing is configured with Steps St11 to St14 described below.

(a) Step St11

First, a column of a link having a value of "1" in a square with respect to a flow (quality-non-degraded flow) with a quality flag of "Good" is eliminated from a flow quality/passing link table.

(b) Step St12

Next, with respect to links having one or more of flows with a quality flag of "Good" passing through the links among remaining links, a sum of p=1 to p=P is determined from Formula 1 described below, where P is a largest value of values in squares of links.

$$\sum_{p=1}^{P} f(G_p, B_p, p) \qquad \text{(Formula 1)}$$

Here, Gp and Bp are the number of flows (quality-non-degraded flows or excellent quality flows) of "Good" and the number of flows (quality-degraded flows) of "Bad", respectively, which have a value p in the above link columns. Also, f(Gp, Bp, p) is a function that increases with respect to a difference between Gp and Bp, decreases with respect to p, and increases with respect to a sum of Gp and Bp.

(c) Step St13

Next, columns of links having a value of Formula 1 exceeding a threshold value set in advance are eliminated.

(d) Step St14

Finally, all rows of flows of "Good" are eliminated.

For example, as an example of f(Gp, Bp, p), one shown as Formula 2 below is considered.

$$f(G_p, B_p, p) = (G_p - B_p)/p \cdot \sqrt{G_p + B_p} \quad \text{(Formula 2)}$$

Figure 8:
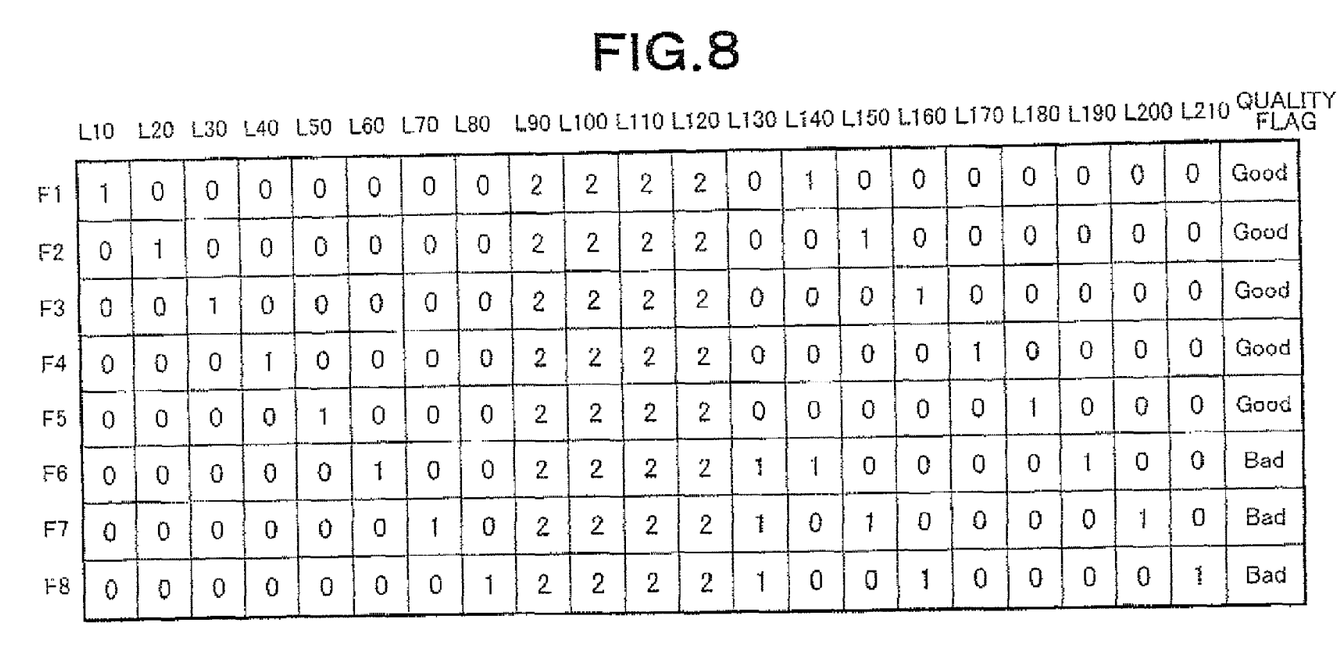
FIG. 8 is a view for explaining an example of a flow quality/passing link table used in the non-degraded link elimination processing shown in FIG. 7.

Hereinafter, an example using Formula 2 is shown. For example, a case in which a flow quality/passing link table as shown in FIG. 8 is determined is considered. In the example of FIG. 8, as flows on paths, there are five flows F1 to F5 with quality flag of "Good", and three flows F6 to F8 with quality flag of "Bad". Then, as links through which such flows pass, there are twenty-one links L10 to L210. Among such links, links that constitute multi-paths are L90 to L120.

Figure 9:
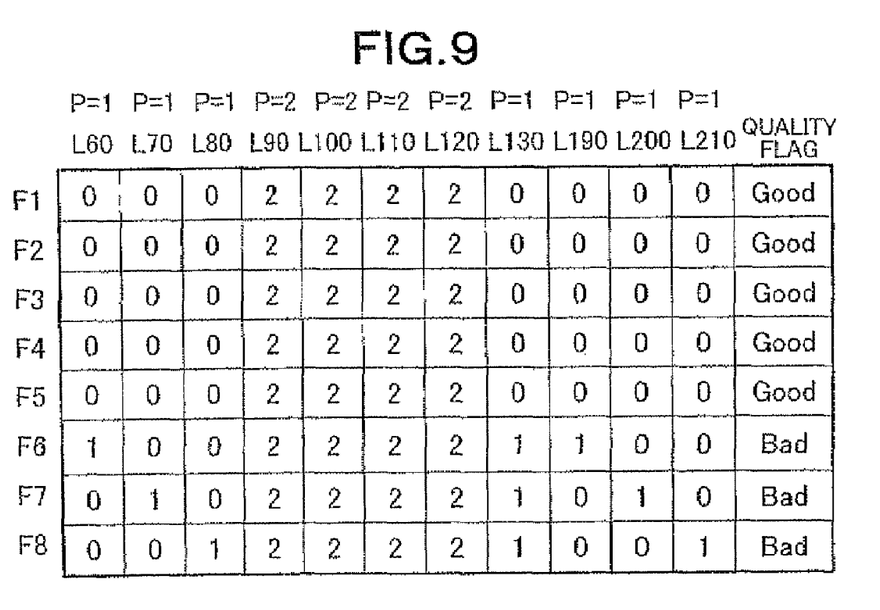
FIG. 9 is a view for explaining an example of the flow quality/passing link table in the middle of eliminating a non-degraded link by the non-degraded link elimination processing shown in FIG. 7.

In this case, columns of the links L10 to L40 and the links L140 to L180 having a value of "1" in squares with respect to the flows F1 to F5 with a quality flag of "Good" are first eliminated as non-degraded links (Step St11). As a result, as shown in FIG. 9, columns of the links L60 to L130 and the links L190 to L210 are left.

Next, a value of Formula 1 is determined (Step St12). In the example of FIG. 9, among the remaining links, P=1 is determined with respect to the links L60 to L80 and the links L180 to L210, and a value of Formula 1 is −1. In a similar manner, P=1 is determined for the link L130, and a value of Formula 1 is −(3)·(3)^(1/2). P=2 is determined with respect to the links L90 to L120, and a value of Formula 2 is 0 when p=1 and a value of Formula 2 is (5−3)/2·(5+3)^(1/2)=2.823 . . . when p=2. Therefore, a value of Formula 1 is 2.823 . . . .

Here, a threshold value for a value of Formula 1 is set to be 2 in advance. Then, the links that have a value of Formula 1 exceeding 2 are the links L90 to L120. Therefore, from the flow quality/passing link table of FIG. 9 determined in Step St11, columns of the links L90 to L120 having a value of Formula 1 exceeding the threshold value set in advance are eliminated (Step St13). Finally, all the flows F1 to F5 of "Good" are eliminated (Step St14).

Figure 10:
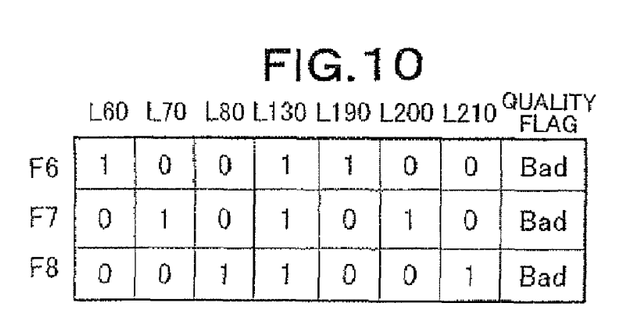
FIG. 10 is a view for explaining a reduced flow quality/passing link table determined by eliminating a non-degraded link from the flow quality/passing link table shown in FIG. 8 by the non-degraded link elimination processing shown in FIG. 7.

As a result, as shown in FIG. 10, a reduced flow quality/passing link table configured with columns of the links L60 to L80, the link L130, and the links L190 to L210, which are left without being eliminated as non-degraded links is determined with respect to the flows F6, F7, and F8 (quality-degraded flows) with a quality flag of "Bad".

That is, in the non-degraded link elimination section 15, with respect to quality-non-degraded flows, links which are on paths of flows and do not configure multi-paths are eliminated as non-degraded links. Links which are on paths of flows and configure multi-paths are eliminated as non-degraded links when such links have high priority which is determined depending on any of the number of multi-paths, and a difference between and a sum of the number of excellent quality flows passing through the links and the number of quality-degraded flows passing the links.

Therefore, according to the present embodiment, in case there is a flow passing through multi-paths, in addition to the advantageous effect to the first exemplary embodiment, there is an advantageous effect that estimation accuracy is further improved since even more non-degraded links can be eliminated. A reason for this will be described below.

In case there are "Good" flows (excellent quality flows) and "Bad" flows (quality-degraded flows) that pass a certain link as one of multi-paths with the number p of paths, as a difference between the number of the "Good" flows and the number of the "Bad" flows is sufficiently large in comparison with the number p of paths, there is high possibility that such link is a "Good" link. With respect to this possibility, the higher a sum of the numbers of the "Good" flows and the "Bad" flows, the higher the possibility such link is a "Good" link (based on law of large numbers). A value of Formula 1 has a higher value as a difference between the number of the "Good" flows and the number of the "Bad" flows is sufficiently large in comparison with the number p of paths, and as a sum of the number of the "Good" flows and the number of the "Bad" flows is higher. Whether a value of Formula 1 is large or small matches with whether possibility of the "Good" link is high or low.

For the above reason, in the present embodiment, by eliminating links having high possibility of being the "Good" links in addition to links eliminated in the first exemplary embodiment, estimation accuracy can be further improved.

Third Exemplary Embodiment

Next, a third exemplary embodiment of the present invention will be described with reference to FIGS. 11 to 13.

The present embodiment is different from the second exemplary embodiment only with respect to operation of the quality-degraded location estimation section 17 of the server S1 for estimating a quality-degraded location. Accordingly, description will be made only with respect to such a different point.

The quality-degraded location estimation section 17 reads out a reduced flow quality/passing link table from the reduced flow quality/passing link table storage section 16. Then, as shown in FIG. 11, the quality-degraded location estimation section 17 uses a multi-paths compatible minimum link number estimation method described below to estimate a quality-degraded location, and outputs such a quality-degraded location to the display section 18.

In processing using an estimation method based on a multi-paths compatible minimum link number by the quality degraded location estimation section 17, a set of flows having a value of "1" or higher as values in squares with respect to link columns in a flow quality/passing link table is called a flow set belonging to the link columns.

Figure 12:
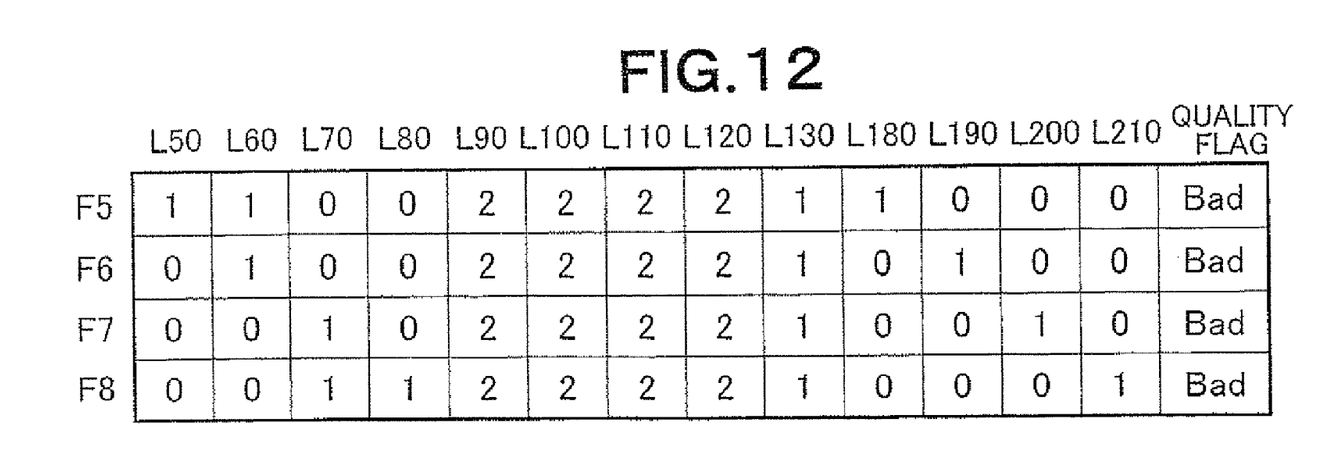
FIG. 12 is a view for explaining an example of the reduced flow quality/passing link table used in the quality-degraded location estimation processing shown in FIG. 11.

For example, consideration is made with respect to a case of a reduced flow quality/passing link table configured with rows of four flows F5 to F8 with a quality flag of "Bad" and columns of thirteen links L50 to L130 and L180 to L210 shown in FIG. 12. In this case, a flow set belonging to a column of the link L60 includes {F5, F6} made up of the flows F5 and F6 having a value of "1". Further, a sum-set of a flow set belonging to each of a plurality of link columns is similarly called a flow set belonging to a set of such link columns. For example, in case of the reduced flow quality/passing link table of FIG. 12, a flow set belonging to a set {L60, L70} of link columns includes {F5, F6, F7, F8}.

Figure 11:
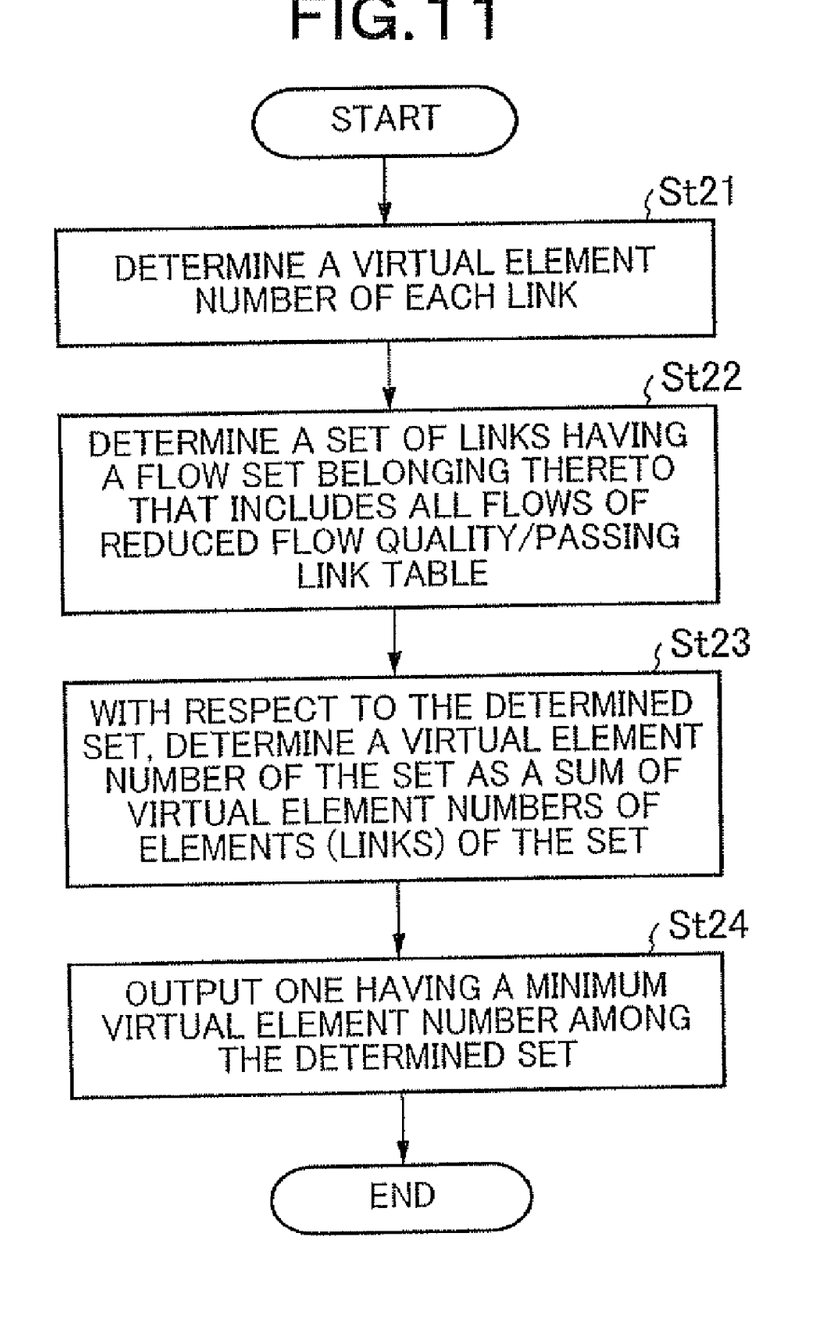
FIG. 11 is a flowchart for explaining processing by the quality-degraded location estimation section of the server for estimating a quality-degraded location in the communication network system according to a third exemplary embodiment of the present invention.

As shown in FIG. 11, the processing by the quality-degraded location estimation section 17 is configured with Steps St21 to St24 described below.

(a) Step St21

First, a virtual element number of a column of each link is determined in a manner described below.

(1) In case a maximum value of values of rows with respect to a column is 1, a virtual element number of such a link is 1.

(2) In case a maximum value of values of rows with respect to a column is 2, a virtual element number of such a link is determined by Formula 3, where the maximum number is P and the number of rows having a value k is n(k).

$$\max_{k=1,\ldots,P} g(n(k)) \quad \text{(Formula 3)}$$

Here, g(x) is a monotonically increasing function, which takes a value of 1 or larger and k or smaller.

For example, for this function g(x), one such as Formula 4 described below is considered.

$$g(x)=\min(k,1+(\max(g(k)-k,0))^2/c) \quad \text{(Formula 4)}$$

where c is a constant.

Here, a virtual element number of a set of link columns is a sum of virtual element numbers of the link columns.

(b) Step St22

A set of link columns, in which flow sets belonging to such set of link columns are identical to all flows of a reduced flow quality/passing link table, is determined.

(c) Step St23

With respect to the determined set, a virtual element number of the set is determined as a sum of virtual element numbers of elements (links) of the set.

(d) Step St24

Among the determined sets, a set having a smallest virtual element number is selected and output. Alternatively, not only the set having the smallest virtual element number, but also sets of link columns up to a predetermined order are selected and output.

For example, in the example of FIG. 12, when virtual element numbers of rows are determined in accordance with a formula of g(x) described above where the constant c=10, the case of (1) described above is applied to the links L50 to L80, L130 to L210, and a virtual element number of such links is 1. In addition, the case of (2) described above is applied to the links L90 to L120, where P=2, n(1)=0, and n(2)=4. When n(1), g(n(1))=min(1, 1+1/10·(max(−1, 0))^2)= 1 is determined, and when n(2), g(n(2))=1/10·2^2=1.4 is determined, therefore a virtual element number of such links is 1.4.

Therefore, in the example of FIG. 12, when the quality-degraded location estimation section 17 carries out the multi-paths compatible minimum link number estimation method, sets of link columns having flow sets which belong to the sets of link columns and identical with all flows of the reduced flow quality/passing link table are {L60, L70}, {L90}, {L100}, {L110}, {L120}, and {L130}, and virtual element numbers for these sets are 2, 1.4, 1.4, 1.4, 1.4, and 1, respectively. Accordingly, in the example of FIG. 12, the set {L130} having a minimum virtual element number of 1 is estimated as a degraded location.

Figure 13:
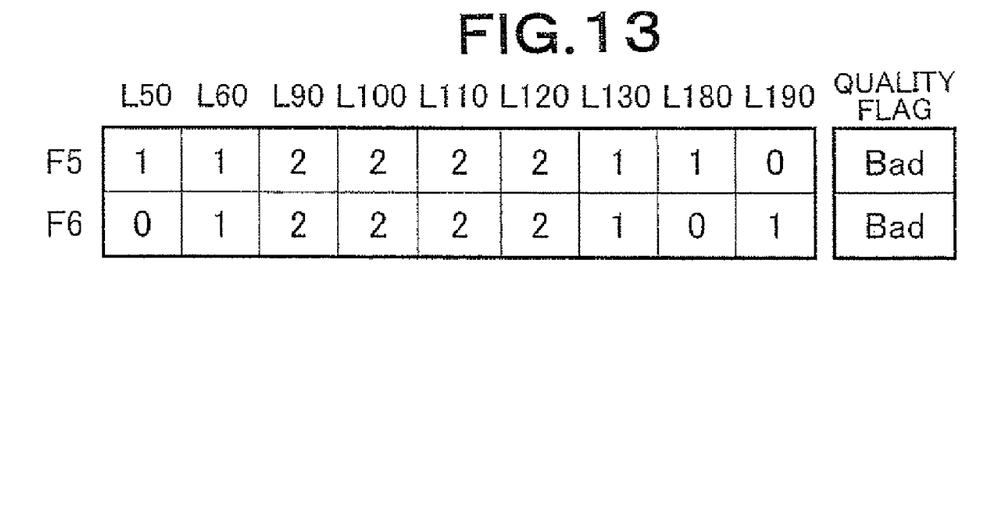
FIG. 13 is a view for explaining another example of the reduced flow quality/passing link table used in the quality-degraded location estimation processing shown in FIG. 11.

On the other hand, consideration is made with respect to a case in which there are only two flows with a quality flag of "Bad", which are F5 and F6, as shown in FIG. 13. In this case, g(n(1))=1 and g(n(2))=g(2)=1 are determined with respect to the links L90 to L120 as shown in FIG. 13, and therefore a virtual element number for these links is 1. Accordingly, in the example of FIG. 13, when the quality-degraded location estimation section 17 carries out the multi-paths compatible minimum link number estimation method, sets of link columns having flow sets which belong to the sets of link columns and identical with all flows of the reduced flow quality/passing link table are {L60}, {L90}, {L100}, {L110}, {L120}, and {L130}, and a virtual element number for all of these sets is 1. Then, all of these sets are estimated as degraded locations.

That is, the quality-degraded location estimation section 17 determines, as degraded links, a combinations of links that have all degraded links passing through the links, and have a minimum sum of virtual element numbers determined for each link depending on the number of multi-path flows passing each link and the number of multi-paths of such flows, from links which were not eliminated as non-degraded links.

Therefore, according to the present embodiment, there is an advantageous effect that, in case there is a degraded flow passing through multi-paths, a degraded location can be estimated with accuracy higher than the second exemplary embodiment, in addition to the advantageous effect of the second exemplary embodiment. A reason for this is as described below.

With respect to a certain link on the reduced flow/passing link table after the non-degraded link removal of the second exemplary embodiment is carried out, in case the link is a link on multi-paths and there are multi-path flows of which the quality is degraded and which passes through the link, the larger the number of multi-path flows, the higher the possibility that quality degradation occurs on all paths of multi-paths. That is, when the number of quality-degraded flows is small, there is quality degradation on a path of part of multi-paths, and there is high possibility that the small number of flows happen to pass the quality-degraded path.

For example, when the example of FIG. 12 and the example of FIG. 13 are compared, the links L90 to L120 are links on multi-paths having two paths, and the number of degraded flows passing through these links is four in the case of FIG. 12 and two in the case of FIG. 13. That is, in FIG. 12, four flows pass through two paths and are all degraded, and in FIG. 13, two flows pass through two paths and are all degraded. The larger number of flows are degraded in FIG. 12, and there is high possibility that both of the two paths are degraded.

In other words, the link sets {L90}, {L100}, {L110}, and {L120} cover all degraded flows in any of the above cases (all degraded flows pass through link elements of the sets). However, in the case of FIG. 12, there is high possibility that, by nature, a set of a combination of two links, for example L90 and L110, cover the degraded flows. Therefore, an element number of the link sets {L90}, {L100}, {L110}, and {L120} should be considered as a value close to 2, not 1. A virtual element number realizes this idea.

Each of the embodiments described above may be configured in a manner described below.

A device for estimating a quality-degraded location includes a flow quality collecting means, a routing information collecting means, a flow quality/passing link table managing means, a non-degraded link elimination means, and a quality-degraded location estimating means. The flow quality collecting means collects flow quality information and a flow rate flowing a network. The routing information collecting means collects configuration information of the network. The flow quality/passing link table managing means determines a link on which a flow passes through from the flow quality information and the configuration information of the network, and manages such links in a table format. In case there is degradation of quality of one or more flows in the flow quality/passing link table, the non-degraded link elimination means determines a quality-degraded flow and a quality-non-degraded flow based on a degradation threshold value and a non-degradation threshold value set in advance. Then, the non-degraded link elimination means eliminates a non-degraded link having the number of quality-non-degraded flows passing through the link which is equal to or larger than a non-degraded flow threshold value set based on the degradation threshold value and the flow rate, from link sets on which a quality-degraded flow passes through. The quality-degraded location estimating means outputs, as quality-degraded locations, a subset that includes links through which arbitrary flows with quality degradation pass and has a minimum element number from subsets of sets determined by eliminating a non-degraded link from links through which a set of the arbitrary flows with quality degradation pass.

According to the above, by eliminating a non-degraded link in which the number of quality-non-degraded flows passing through the link is equal to or larger than a non-degraded flow number threshold value set based on the degradation threshold value and the flow rate, links which are not degraded are eliminated with sufficiently high probability. Therefore, accuracy of the degraded link estimation can be improved.

With respect to a server for estimating a quality-degraded location configuring a communication network system according to each of the above described exemplary embodiments, hardware and software configurations are not limited in particular, as long as functions of the above-described sections (the flow quality information collection section, the routing information collection section, the flow quality/passing link table management section, the flow quality/passing link table storage section, the non-degraded link elimination section, the reduced flow quality/passing link table storage section, and the quality-degraded location estimation section) can be realized. For example, a circuit (or a program component) may be configured independently for each function of each of the sections, or functions of the sections may be configured in an integrated manner in one circuit. In case functions of each of the sections are realized by software processing mainly by a computer (a central processing unit or a CPU), a program configuring the software and a computer-readable recording medium that records the program are also included in the scope of the present invention.

The present invention can be applied for purposes of a device, a method, and a program that estimate a degraded location of communication quality of a communication network system.

An exemplary advantage according to the invention is that, estimation can be carried out with high accuracy based on flow quality information in a situation where, although a set of links that may have a flow passing through is known, which of such links the flow passed through cannot be identified, such as multi-paths routing, load distribution routing, and the like.

Furthermore, according to a third exemplary embodiment of the invention, there is provided a method for estimating a quality-degraded location of a communication network, comprising: collecting communication quality information of a flow passing the communication network; collecting routing information of the communication network; determining a quality-degraded flow and a quality-non-degraded flow based on the flow quality information and determining links through which the flow passes from the routing information of the communication network; eliminating a link not configuring multi-paths on the links on a pass of the flow as a non-degraded link, without eliminating a link configuring multi-paths on the links on a pass of the flow as a non-degraded link, with respect to the quality-non-degraded flow; and determining a degraded link from links not eliminated as the non-degraded link.

Furthermore, according to a fourth exemplary embodiment of the invention, there is provided a program for allowing a computer to perform a method for estimating a quality-degraded location of a communication network, the method comprising: collecting communication quality information of a flow passing the communication network; collecting routing information of the communication network; determining a quality-degraded flow and a quality-non-degraded flow based on the flow quality information and determining links through which the flow passes from the routing information of the communication network; eliminating a link not configuring multi-paths on the links on a pass of the flow as a non-degraded link, without eliminating a link configuring multi-paths on the links on a pass of the flow as a non-degraded link, with respect to the quality-non-degraded flow; and determining a degraded link from links not eliminated as the non-degraded link.

While the invention has been particularly shown and described with reference to the exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A device for estimating a quality-degraded location of a communication network, comprising:
   a flow quality information collecting unit to collect communication quality information of flows passing the communication network through a plurality of links;
   a routing information collecting unit to collect routing information of the communication network;
   a determining unit to determine one or more quality-degraded flows and one or more quality-non-degraded flows based on the flow quality information and to determine whether or not each of said one or more quality-non-degraded flows passes through each of the links and whether or not each of said one or more quality-degraded flows passes through each of the links based on the routing information of the communication network, wherein each of the links are identified to be a link which configures multi-paths or a link which does not configure multi-paths,
   an original table generator to generate an original table, each row of said original table corresponding to each flow, each column of said original table corresponding to each link, and a value of each cell of said original table representing whether or not each of said one or more quality-non-degraded flows passes through each of the links, whether or not each of said one or more quality-degraded flows passes through each of the links, and whether or not each of the links configures to multipaths;
   a reduced table generator to generate a reduced table by eliminating, from said original table, one or more columns, each of which includes at least a cell through which a quality-non-degraded flow passes and which does not configure multi-paths and by eliminating, from said original table, one or more rows, each of which corresponds to each of said one or more quality-non-degraded flows; and
   a degraded link determining unit to determine one or more degraded links from the links, each of which has a corresponding column in said reduced table.

2. The device according to claim 1, wherein
   the reduced table generator also eliminates one or more columns, each of which corresponds to, as a non-degraded link, a link configuring multi-paths that has high priority which is determined depending on any of the number of multi-paths, and a difference between and a sum of the number of excellent quality flows passing the link and the number of quality-degraded flows passing the link, with respect to the quality-non-degraded flow.

3. The device according to claim 1, wherein
   the degraded link determining unit determines, as said one or more degraded links, a combination of links that all degraded links pass through, and have a sum of virtual element numbers determined for links based on the number of multi-path flows passing through each link and the number of multi-paths of the flows, from links not eliminated as the non-degraded link.

4. A method for estimating a quality-degraded location of a communication network, comprising:
- collecting communication quality information of flows passing the communication network;
- collecting routing information of the communication network through a plurality of links;
- determining one or more quality-degraded flows and one or more quality-non-degraded flows based on the flow quality information and determining whether or not each of said one or more quality-non-degraded flows passes through each of the links and whether or not each of said one or more quality-degraded flows passes through each of the links based on the routing information of the communication network, wherein each of the links are identified to be a link which configures multi-paths or a link which does not configure multi-paths;
- generating an original table, each row of said original table corresponding to each flow, each column of said original table corresponding to each link, and a value of each cell of said original table representing whether or not each of said one or more quality-non-degraded flows passes through each of the links, whether or not each of said one or more quality-degraded flows passes through each of the links, and whether or not each of the links configures multi-paths;
- generating a reduced table by eliminating, from said original table, one or more columns, each of which includes at least a cell through which a quality-non-degraded flow passes and which does not configure multi-paths and by eliminating, from said original table, one or more rows, each of which corresponds to each of said one or more quality-non-degraded flows; and
- determining one or more degraded links from the links, each of which has a corresponding column in said reduced table,
- wherein the steps of determining one or more quality-degraded flows and one or more quality-non-degraded flows, generating said original table and generating said reduced table are performed with a determining unit and a selection unit, an original table generator and a reduced table generator, respectively.

5. The method according to claim 4, wherein the selecting step also eliminates one or more columns, each of which corresponds to, as a non-degraded link, a link configuring multi-paths that has high priority which is determined depending on any of the number of multi-paths, and a difference between and a sum of the number of excellent quality flows passing the link and the number of quality-degraded flows passing the link, with respect to the quality-non-degraded flow.

6. The method according to claim 4, wherein the determining step determines, as said one or more degraded links, a combination of links that all degraded links pass through, and have a sum of virtual element numbers determined for links based on the number of multi-path flows passing through each link and the number of multi-paths of the flows, from links not eliminated as the non-degraded link.

7. A non-transitory computer-readable storage medium storing a program of instructions for allowing a computer to perform a method for estimating a quality-degraded location of a communication network, the method comprising:
- collecting communication quality information of flows passing the communication network;
- collecting routing information of the communication network through a plurality of links;
- determining one or more quality-degraded flows and one or more quality-non-degraded flows based on the flow quality information and determining whether or not each of said one or more quality-non-degraded flows passes through each of the links and whether or not each of said one or more quality-degraded flows passes through each of the links based on the routing information of the communication network, wherein each of the links are identified to be a link which configures multi-paths or a link which does not configure multi-paths;
- generating an original table, each row of said original table corresponding to each flow, each column of said original table corresponding to each link, and a value of each cell of said original table representing whether or not each of said one or more quality-non-degraded flows passes through each of the links, whether or not each of said one or more quality-degraded flows passes through each of the links, and whether or not each of the links configures multi-paths;
- generating a reduced table by eliminating, from said original table, one or more columns, each of which includes at least a cell through which a quality-non-degraded flow passes and which does not configure multi-paths and by eliminating, from said original table, one or more rows, each of which corresponds to each of said one or more quality-non-degraded flows; and
- determining one or more degraded links from the links, each of which has a corresponding column in said reduced table.

8. The non-transitory computer-readable storage medium according to claim 7, wherein
the selecting step also eliminates one or more columns, each of which corresponds to, as a non-degraded link, a link configuring multi-paths that has high priority which is determined depending on any of the number of multi-paths, and a difference between and a sum of the number of excellent quality flows passing the link and the number of quality-degraded flows passing the link, with respect to the quality-non-degraded flow.

9. The non-transitory computer-readable storage medium according to claim 7, wherein
the determining step determines, as said one or more degraded links, a combination of links that all degraded links pass through, and have a sum of virtual element numbers determined for links based on the number of multi-path flows passing through each link and the number of multi-paths of the flows, from links not eliminated as the non-degraded link.

10. A communication network system, comprising the device according to claim 1.

* * * * *